(12) United States Patent
Clapp

(10) Patent No.: US 12,472,620 B2
(45) Date of Patent: Nov. 18, 2025

(54) TOOL HOLDING SYSTEM

(71) Applicant: Guy Clifford Clapp, Fort Worth, TX (US)

(72) Inventor: Guy Clifford Clapp, Fort Worth, TX (US)

( * ) Notice: Subject to any disclaimer, the term of this patent is extended or adjusted under 35 U.S.C. 154(b) by 0 days.

(21) Appl. No.: 18/423,230

(22) Filed: Jan. 25, 2024

(65) Prior Publication Data
US 2024/0157542 A1     May 16, 2024

Related U.S. Application Data

(63) Continuation-in-part of application No. 17/336,727, filed on Jun. 2, 2021, now Pat. No. 11,931,882.

(51) Int. Cl.
| | |
|---|---|
| *B25H 3/00* | (2006.01) |
| *B25H 3/02* | (2006.01) |
| *B25H 3/04* | (2006.01) |
| *A47B 3/00* | (2006.01) |
| *A47B 81/00* | (2006.01) |

(52) U.S. Cl.
CPC ............... *B25H 3/04* (2013.01); *B25H 3/022* (2013.01); *A47B 3/00* (2013.01); *A47B 81/005* (2013.01)

(58) Field of Classification Search
CPC .. B25H 3/04; B25H 3/00; B25H 3/022; A47B 81/005
See application file for complete search history.

(56) References Cited

U.S. PATENT DOCUMENTS

| | | | | |
|---|---|---|---|---|
| 2,953,251 A | * | 9/1960 | Stone ...................... | A47J 47/16 211/4 |
| 3,489,288 A | * | 1/1970 | Mcdaniel ................. | B25H 3/04 248/301 |
| 4,557,456 A | * | 12/1985 | Mueller ................. | A45C 13/02 248/220.31 |
| 5,678,700 A | * | 10/1997 | Crosson, Jr. ........... | A01K 97/10 211/60.1 |
| 5,815,979 A | * | 10/1998 | George .................. | A01K 97/06 43/57.2 |
| 6,202,865 B1 | * | 3/2001 | Kuo ....................... | A47F 5/0815 211/70.6 |
| 6,929,223 B2 | * | 8/2005 | Hancock ................ | F16M 13/00 224/462 |
| 7,175,031 B2 | * | 2/2007 | Matthews ............... | B25H 3/04 211/70.6 |
| 7,237,685 B2 | * | 7/2007 | Keegan ................. | A47F 7/0028 211/60.1 |
| 9,282,817 B2 | * | 3/2016 | Yates .................. | A47B 81/005 |
| D782,265 S | * | 3/2017 | Szucs ............................. | D8/71 |
| 9,925,825 B1 | * | 3/2018 | Hoffmann, IV ....... | A45C 13/10 |
| 10,542,738 B2 | * | 1/2020 | Moses ................... | A47F 7/0035 |

(Continued)

*Primary Examiner* — Kimberley S Wright
(74) *Attorney, Agent, or Firm* — D. Tiller Law PLLC; Don Tiller

(57) ABSTRACT

A tool holding mechanism includes an upper slotted segment, a lower slotted segment, and a back segment. The upper slotted segment extends from the back segment at an obtuse angle. The lower slotted segment extends from the back segment at roughly 90 degrees. The one or more slots of the upper segment and one or more slots of the lower segment are configured to accept a tool into upper and lower slots. The tool holding mechanism may include a magnet or elastic band hooks to secure tools in place in the slots.

10 Claims, 10 Drawing Sheets

(56) References Cited

U.S. PATENT DOCUMENTS

| | | | | |
|---|---|---|---|---|
| 2005/0145587 A1* | 7/2005 | Matthews | ............... | B25H 3/04 |
| | | | | 211/70.1 |
| 2006/0065563 A1* | 3/2006 | Schmidt | ............... | B25H 3/003 |
| | | | | 206/372 |
| 2006/0070965 A1* | 4/2006 | Keegan | ............... | A47F 7/0028 |
| | | | | 211/60.1 |
| 2008/0164230 A1* | 7/2008 | Keegan | ............... | A47B 81/005 |
| | | | | 211/60.1 |
| 2010/0314978 A1* | 12/2010 | Manalang | ............... | B25H 3/06 |
| | | | | 312/317.3 |
| 2015/0115786 A1* | 4/2015 | Manalang | ............. | A47B 31/00 |
| | | | | 312/294 |
| 2015/0201601 A1* | 7/2015 | Honermann | ........... | A01K 97/01 |
| | | | | 211/13.1 |
| 2018/0200877 A1* | 7/2018 | Su | ........................ | B25H 3/04 |
| 2019/0045922 A1* | 2/2019 | Jacobs | ................. | A01K 97/10 |
| 2019/0223424 A1* | 7/2019 | Moses | ................. | A47F 7/0035 |

\* cited by examiner

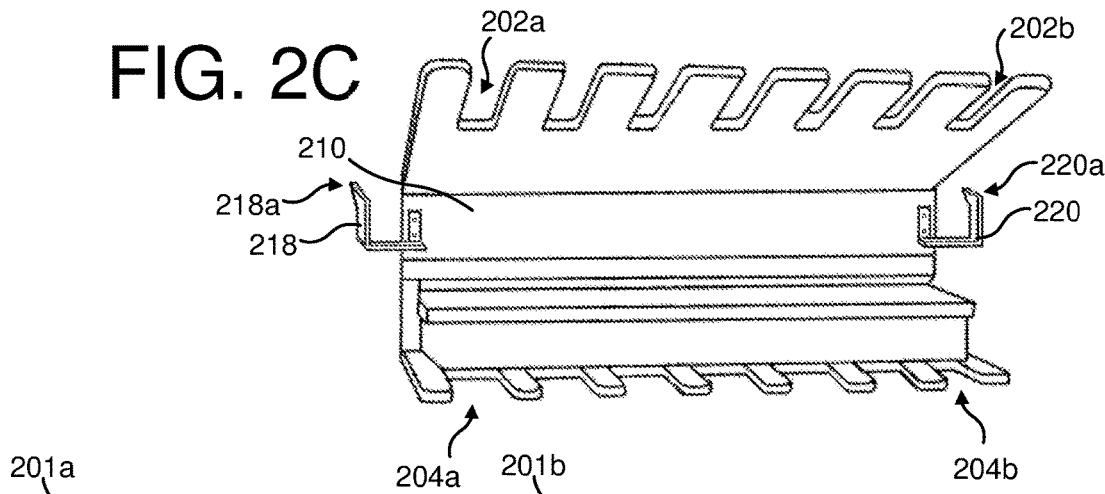
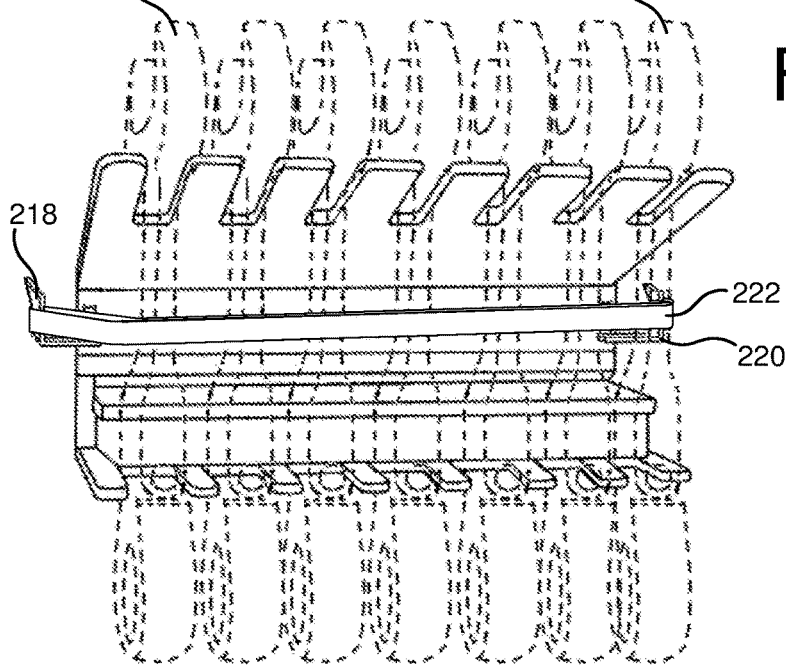
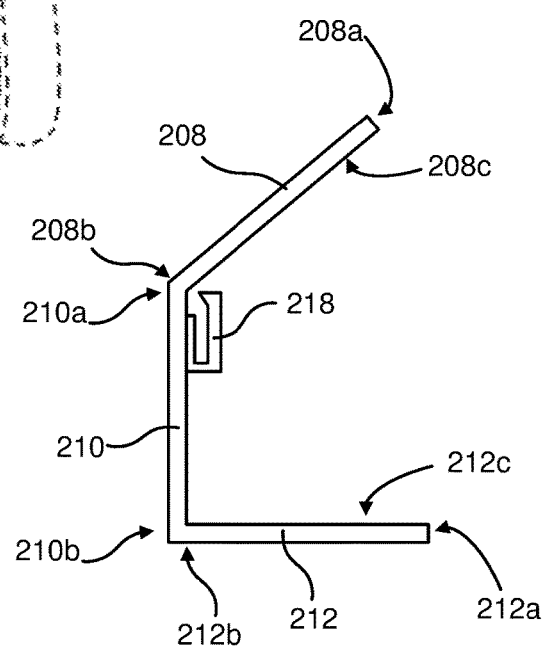

TOOL HOLDING SYSTEM

CROSS-REFERENCE TO RELATED APPLICATIONS

This application claims the benefit of: U.S. patent application Ser. No. 17/336,727, filed on Jun. 2, 2021.

BACKGROUND AND SUMMARY

This invention pertains generally to tool holding mechanisms and systems.

Tool boxes are used in a variety of configurations and purposes. Some tool boxes are configured for maximum storage in a compact container. Other tool boxes are configured to store higher quantities of tools.

Storage mechanisms may be configured to be easily accessible for tools that are used often. However, easily accessible storage mechanisms lack security and significant restraining features that prevent tools from being stolen or becoming loose floating items in a tool enclosure.

Accordingly, there is a need for tool holding mechanisms and systems to efficiently store and securely engage tools for ease of access and transport.

In an aspect of the invention, a tool holding mechanism includes two slotted plate-like segments extending out from a spanning plate-like segment. In use, the mechanism is oriented so that one of the slotted segments (the top segment) is positioned above the other segment (the bottom segment). The top segment extends out from the spanning segment (the back segment) at an angle greater than 90 degrees, so that the top segment is angled up: the point at which the top segment is attached to the back segment (the proximal edge of the top segment) is positioned below the distal edge of the top segment. Top segment slots are open to the distal edge of the top segment. The bottom segment extends out from the spanning segment at an angle of about 90 degrees (90 degrees±20 degrees). Bottom segment slots are open to the distal edge of the bottom segment. The top and bottom slots are aligned such that a portion of an elongate tool (e.g., the beam of a wrench or the shank of a screwdriver) can be positioned in both slots at once. The upward slope of the top segment serves to engage a feature of the tool that is wider than the slot (e.g., the open end of a wrench or the handle of a screwdriver). To remove the tool from the mechanism, the tool must first be moved up so that the wide portion of the tool is above the slot opening on the top segment. Thus, the upward slope of the top segment helps restrain the tool from inadvertent escape from the tool holder. The top and bottom segments may be fastened to the back segment through conventional fastening means such as welding, gluing, or bolting. The various segments may also be integrally formed by bending, casting, or printing.

The tool holding mechanism may include a magnet positioned between the top and bottom segments such that the magnet will engage a portion of an elongate tool positioned in both slots at once. For example, the magnet may engage the beam of a slot-mounted wrench to further restrain the wrench against inadvertent escape from the tool holder.

The tool holding mechanism may include hooks positioned on the left and right sides of the holder (e.g., one connected to the left side of the back segment and another connected to the right side of the back segment, each hook positioned between the top and bottom segments). These are band-retention hooks in that they are configured to retain an elastic band. In use, an elastic band may be positioned on the hooks such that the band is stretched to span the distance between the hooks and is positioned on the side of any tool(s) positioned in the holder slot(s) that is away from the back segment. Thus, the band further restrains the tool(s) from inadvertent escape from the tool holder.

In another aspect of the invention, a portable tool holding system includes a mountable plate having a mounting surface and a mounting feature. The mounting feature may be, e.g., a hook configured to engage a door or other slab and thereby mount the mountable plate to the door by hanging the plate from the top of the door. The mounting feature may be, e.g., a keyhole slot configured to engage a stud projecting from a surface, such as bolthead or screwhead and thereby mount the mountable plate to the surface by hanging the plate from the stud. The mounting surface is configured to receive tool holding mechanisms, such as the tool holding mechanism described above. The portable tool holding system includes a handle by which a user may hold and move the system. Thus, the system is "portable" in that it can be mounted, dismounted, and moved manually. The portable tool holding system includes a plurality of tool holding mechanisms mounted to the mounting surface. For example, the portable tool holding system may include a tool holding mechanism as described above that is welded or bolted or integral to the mounting surface. The tool restraining aspects of the tool holding mechanism help prevent inadvertent tool escape when the portable system is mounted, dismounted, or transported.

BRIEF DESCRIPTION OF THE DRAWINGS

These and other features, aspects, and advantages of the present invention will become better understood with reference to the following description, appended claims, and accompanying drawings where:

FIGS. 2A-2E are various views of configurations of a first tool holding mechanism according to aspects of the invention.

DETAILED DESCRIPTION

Figure 1:
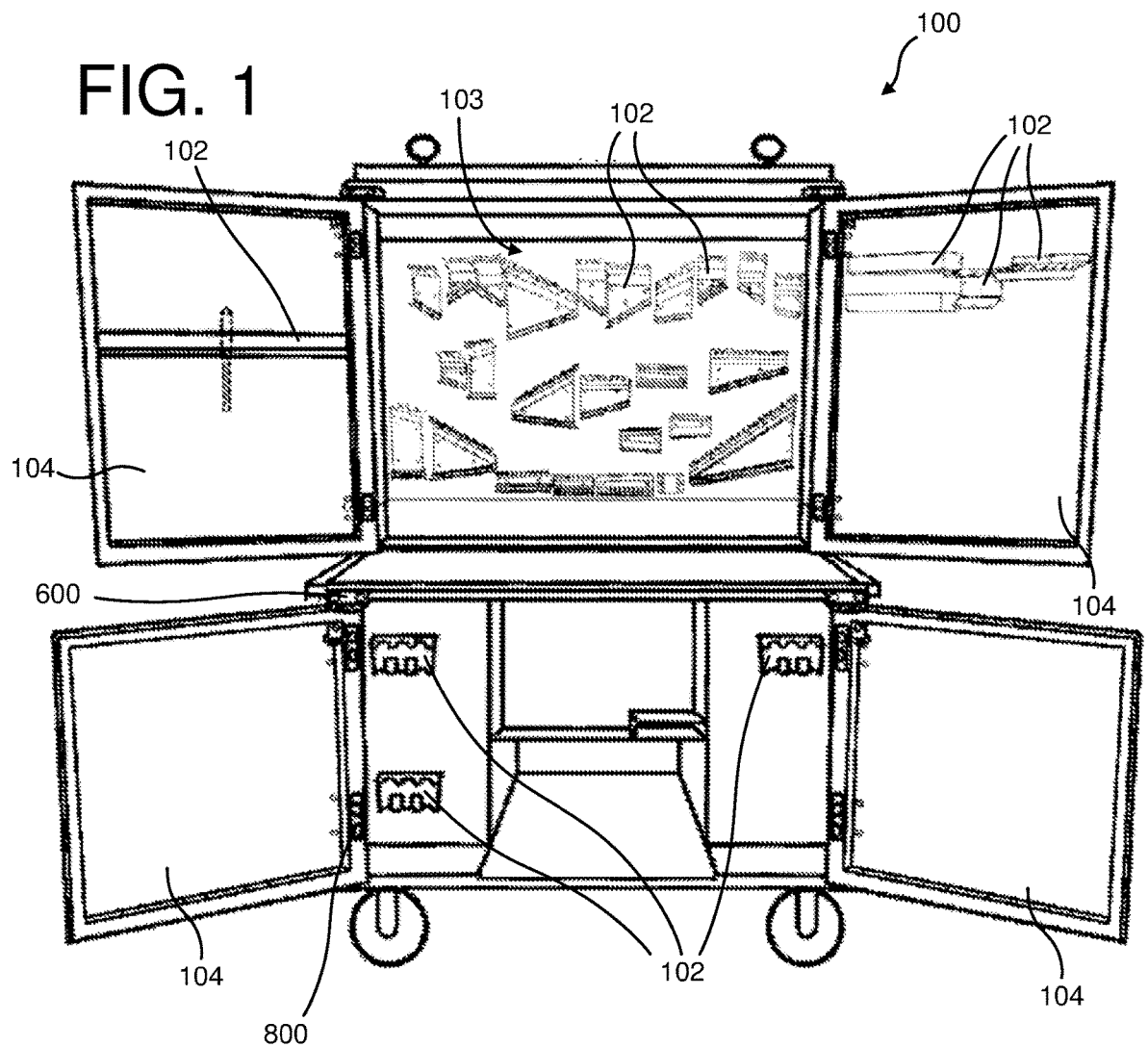
FIG. 1 is a front perspective view of a tool box according to an aspect of the invention.

In the summary above, and in the description below, reference is made to particular features of the invention in the context of exemplary embodiments of the invention. The features are described in the context of the exemplary embodiments to facilitate understanding. But the invention is not limited to the exemplary embodiments. And the features are not limited to the embodiments by which they are described. The invention provides a number of inventive features which can be combined in many ways, and the invention can be embodied in a wide variety of contexts. Unless expressly set forth as an essential feature of the invention, a feature of a particular embodiment should not be read into the claims unless expressly recited in a claim.

Except as explicitly defined otherwise, the words and phrases used herein, including terms used in the claims, carry the same meaning they carry to one of ordinary skill in the art as ordinarily used in the art. The terms "first," "second," and the like may be used to distinguish one element from another without denoting any order or importance.

Because one of ordinary skill in the art may best understand the structure of the invention by the function of various structural features of the invention, certain structural features may be explained or claimed with reference to the function of a feature. Unless used in the context of describing or claiming a particular inventive function (e.g., a process), reference to the function of a structural feature refers to the capability of the structural feature, not to an instance of use of the invention.

Except for claims that include language introducing a function with "means for" or "step for," the claims are not recited in so-called means-plus-function or step-plus-function format governed by 35 U.S.C. § 112(f). Claims that include the "means for [function]" language but also recite the structure for performing the function are not means-plus-function claims governed by § 112(f). Claims that include the "step for [function]" language but also recite an act for performing the function are not step-plus-function claims governed by § 112(f).

Except as otherwise stated herein or as is otherwise clear from context, the inventive methods comprising or consisting of more than one step may be carried out without concern for the order of the steps.

The terms "comprising," "comprises," "including," "includes," "having," "haves," and their grammatical equivalents are used herein to mean that other components or steps are optionally present. For example, an article comprising A, B, and C includes an article having only A, B, and C as well as articles having A, B, C, and other components. And a method comprising the steps A, B, and C includes methods having only the steps A, B, and C as well as methods having the steps A, B, C, and other steps.

Terms of degree, such as "substantially," "about," and "roughly" are used herein to denote features that satisfy their technological purpose equivalently to a feature that is "exact." For example, a component A is "substantially" perpendicular to a second component B if A and B are at an angle such as to equivalently satisfy the technological purpose of A being perpendicular to B.

Except as otherwise stated herein, or as is otherwise clear from context, the term "or" is used herein in its inclusive sense. For example, "A or B" means "A or B, or both A and B."

FIG. 1 depicts a front perspective of an exemplary tool box 100 according to an aspect of the invention. The tool box 100 may include a variety of tool holding mechanisms 102, at least one door 104, at least one door stop mechanism 600, and at least one hinge locking system 800.

In one embodiment, the tool box 100 may comprise multiple tiers, each tier comprising storage capacity for tool holding mechanisms. One of ordinary skill in the art will appreciate that the tool box 100 may comprise a variety of combinations and quantities of different tool holding mechanisms.

Figure 2A:
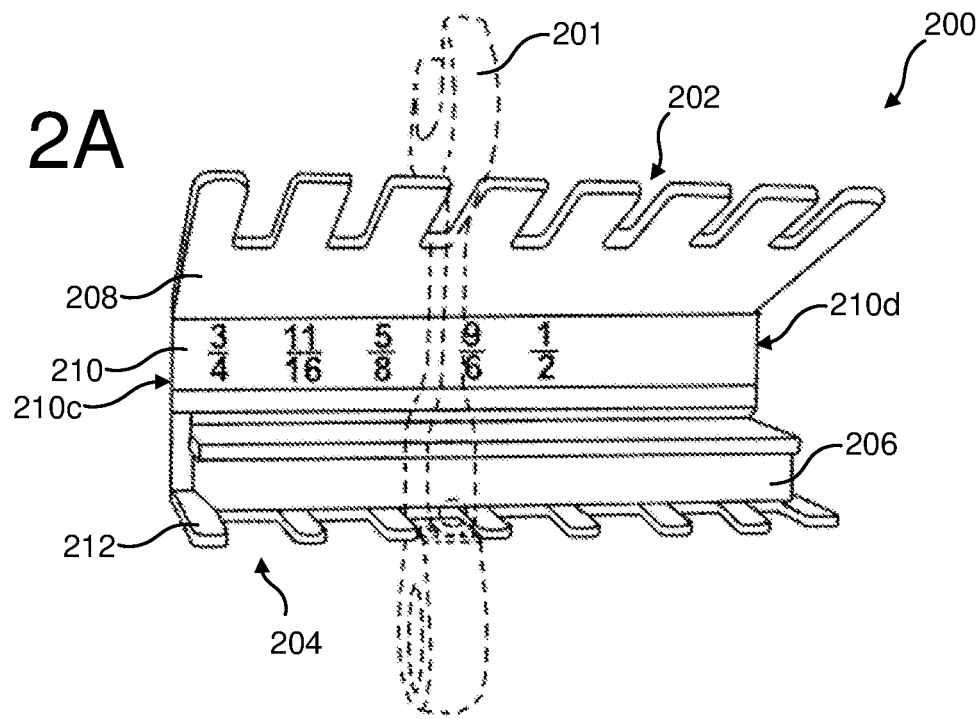
Figure 2B:
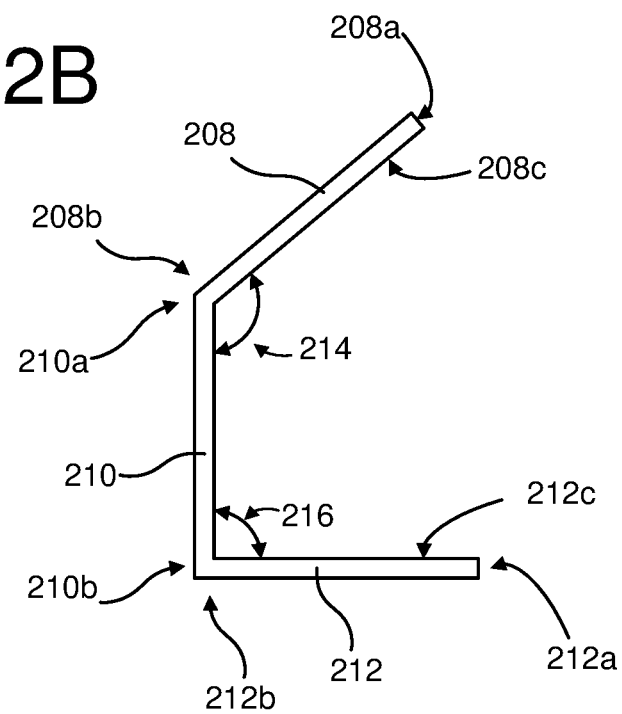

FIGS. 2A-2B are front perspective and left-side views, respectively, of an exemplary first tool holding mechanism 200. (For sake of clarity, FIG. 2B omits certain features depicted in FIG. 2A.) In one embodiment, the first tool holding mechanism 200 may comprise a first cavity 202, a second cavity 204, and a magnetic strip 206 interposed between the first cavity 202 and the second cavity 204. The magnetic strip 206 may be disposed in a configuration that allows a tool 201 that is placed in the first cavity 202 and the second cavity 204 to magnetically couple to the magnetic strip 206.

The first cavity 202 may comprise a width that allows a first portion of a tool 201 to pass into the first cavity 202. The second cavity 204 may comprise a width that allows a second portion of the tool to pass into the second cavity 204. In one embodiment, the width of the first cavity 202 may be substantially the same as the width of the second cavity 204. In another embodiment, the width of the first cavity 202 may be different than the width of the second cavity 204. One of ordinary skill in the art will appreciate that different widths are realized for different tools. The first tool holding mechanism 200 may be configured to receive a custom set of tools. One of ordinary skill in the art will also appreciate that the first tool holding mechanism 200 may be configured to comprise a plurality of same or different first cavities 202 and second cavities 204.

In one embodiment, the magnetic strip 206 may be disposed closer to the second cavity 204 than to the first cavity 202. One of ordinary skill in the art will appreciate that the magnetic strip 206 may be interposed at any location between the first cavity 202 and the second cavity 204.

In one embodiment, the first tool holding mechanism 200 may comprise a single piece of material, such as, but not limited to, aluminum. The single piece of material may be bent at two locations to form an upper segment 208 and a lower segment 212. In one embodiment, the bends may be configured to create angles that are at least substantially equal to, or greater than, ninety-degrees. In one embodiment, the upper segment 208 may include the first cavity 202 (an upper slot) and the lower segment 212 may include the second cavity 204 (a lower slot).

The first tool holding mechanism 200 may be coupled to a surface of the tool box 100. In one embodiment, the surface may be an internal surface of the tool box 100. In one embodiment, the surface may an internal surface of the door of the tool box 100.

Figure 9:
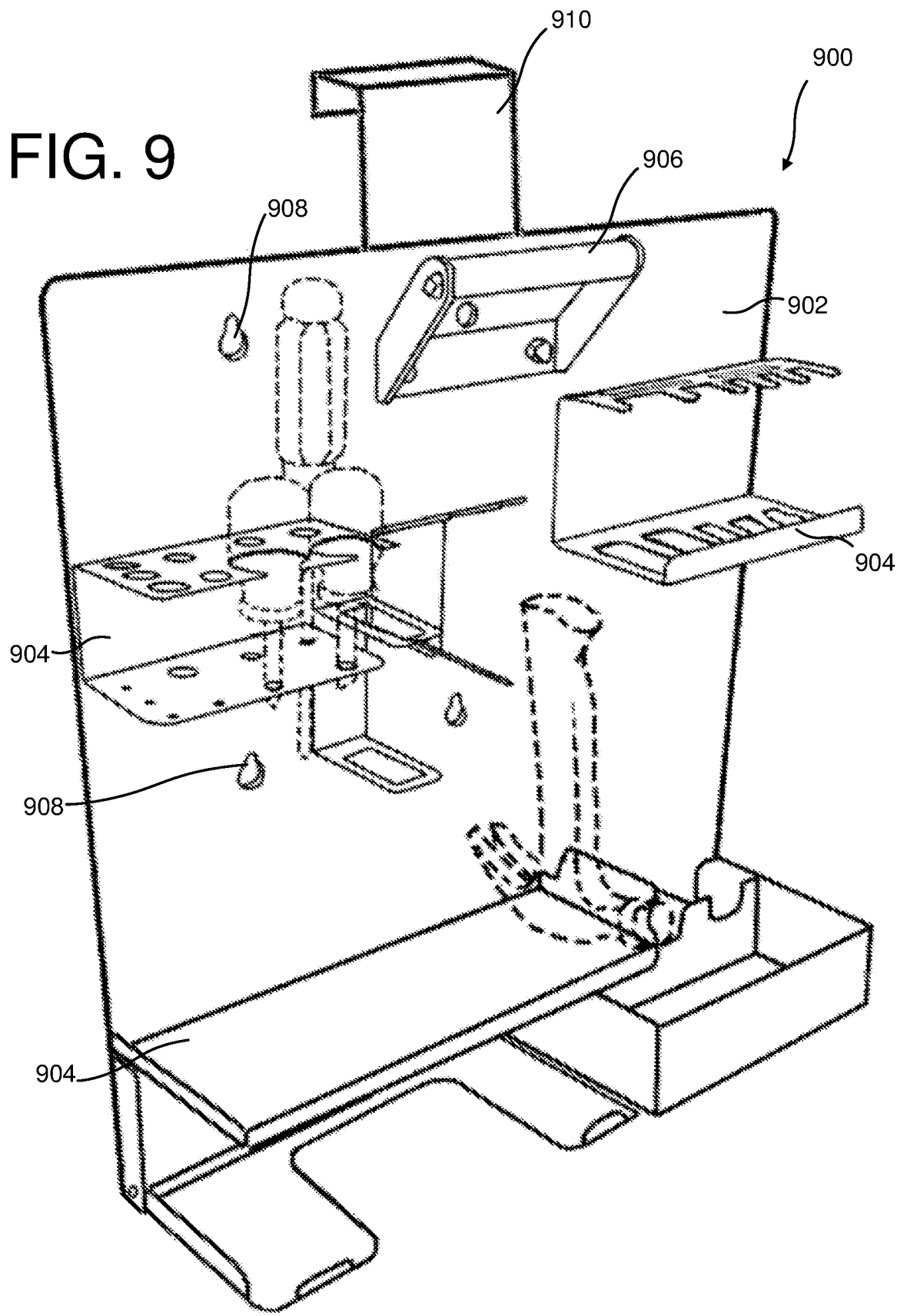
FIG. 9 is a perspective view of a portable tool holding system according to an aspect of the invention.

In one embodiment, the first tool holding mechanism 200 may be coupled to a surface of a mountable plate, such as the mountable plate 902 of FIG. 9.

In an exemplary embodiment, the first tool holding mechanism 200 may comprise: (1) a back segment 210 having a top side 210a, a bottom side 210b, a left side 210c, and a right side 210d, (2) a top segment 208 having a front side 208a, a back side 208b, a face 208c, and an upper slot 202 and configured to project out from the back segment 210 with a facing angle 214 of greater than 90 degrees, and (3) a bottom segment 212 having a front side 212a, a back side 212b, a face 212c, and a lower slot 204 and configured to project out from the back 210 with a facing angle 215 of about 90 degrees (i.e., 90 degrees ±20 degrees). The "face" 208c of the top surface 208 is that side oriented toward the bottom surface 212. The "face" 212c of the bottom surface 212 is that side oriented toward the top surface 208. The "facing angle" 214, 216 is the angle between the top or bottom segment 208, 212 and the back surface 210 on the side of the surface's face 208c, 212c.

FIGS. 2C-2E are front perspective (FIGS. 2C-2D) and left-side (FIG. 2E) views of the exemplary first tool holding mechanism 200 configured with band-retention hooks 218, 220 to secure tools in the mechanism 200 using an elastic band 222. (For sake of clarity, FIG. 2E omits certain features depicted in FIGS. 2C-2D.) One or more band-retention hooks 218, 220 are affixed or integral to the back 210 of the tool holding mechanism 200 toward the left 210c and/or right 210d of the back 210. (The band-retention hooks may be affixed or integral to a segment other than the back segment.) The hooks 218, 220 are configured to receive and retain an elastic band to the left and right of the left-most 201a and right-most 201b tools in the tool holding mechanism 200 when the mechanism 200 is loaded with tools. In a preferred embodiment, a left hook 218 is positioned on the back segment 210 such that a band-securing feature 218a of the hook 218 is positioned to the left of the left-most tool slots 202a, 204a and a right hook 220 is positioned on the back 210 such that a band-securing feature 220a of the hook 220 projects to the right of the right-most tool slots 202b, 204b. The band 222 is configured to engage the hooks 218, 220 under tension when the mechanism 200 is loaded with tools; this tension provides a force on the tools 201 toward the back segment 210 of the mechanism, thereby holding the tools 201 in place in the slots 202, 204. (In a single-tool embodiment, having only a single upper slot 202 and a single lower slot 204, the left-most and right-most slots (or tools) are the same slot (or tool).) The tool-retaining force provided by the band 222 engaging the hooks 218, 220 serves to hold the tools in place, e.g., during transport. The band 222 may be variously configured to provide various retaining forces depending on the application. For example, the force may be increased for heavier tools or harsher transport conditions by shortening or thickening or stiffening the band 222. The length and/or thickness of the band can be identified by the color of the band. Multiple bands may also be employed, using the same or different band-retention hooks. For example, a mechanism may be configured with two pairs of band-retention hooks, each pair designated for a distinct band. In another example, a mechanism may be configured with one pair of band-retention hooks wherein each hook is of sufficient dimension to receive multiple bands.

Figure 10A:
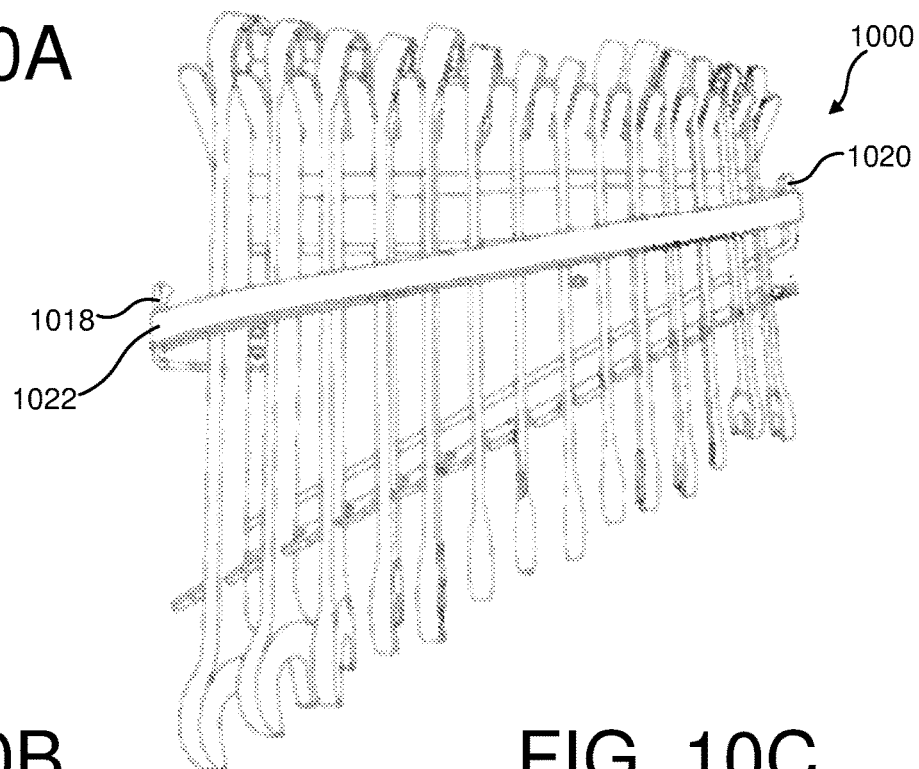
FIGS. 10A-10C are various views of an exemplary first tool holding mechanism according to an aspect of the invention.
Figure 10B:
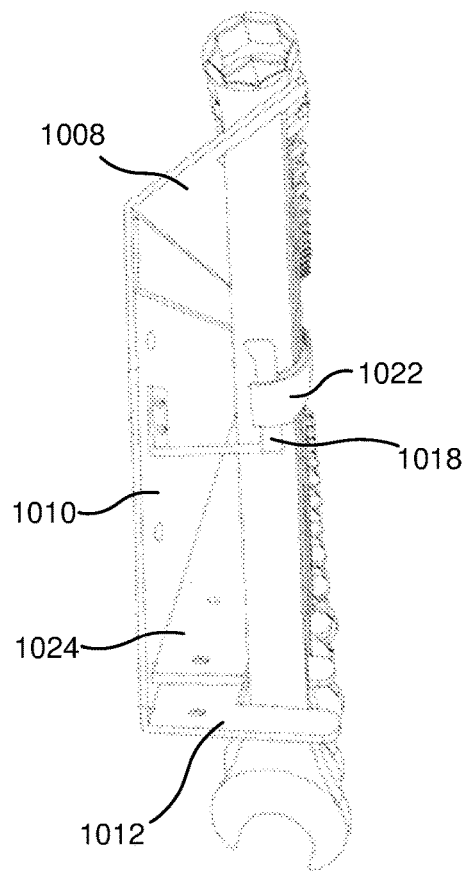
Figure 10C:
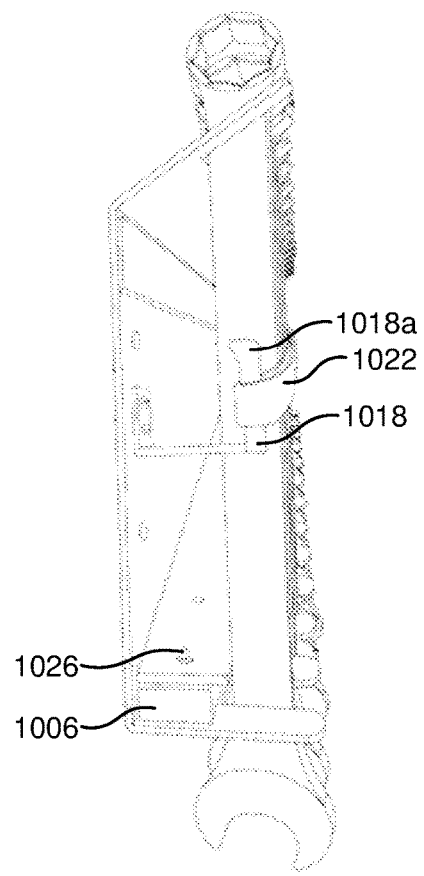

FIGS. 10A-10C depict another exemplary tool holding mechanism 1000 configured with band-retention hooks 1018, 1020 to secure tools in the mechanism 1000 using an elastic band 1022. FIG. 10A is a front perspective view, FIGS. 10B-10C are side perspective views. As with the exemplary embodiment described with reference to FIGS. 2A-2E, the tool holding mechanism 1000 in FIGS. 10A-10C includes a slotted upper segment 1008 projecting out from a back segment 1010 at an obtuse facing angle and a slotted lower segment 1012 projecting out from the back segment 1010 at about a 90-degree facing angle. One or more band-retention hooks 1018, 1020 project from the back 1010 and are configured to receive and retain a rubber band 1022 that may be placed relative to the tools and retention hooks 1018, 1020 so as to provide a force on the tools directed to the back 1010 and thereby retain the tools in the slots of the upper and lower segments 1008, 1012. The mechanism 1000 may include a magnet 1006 positioned between the upper and lower segments 1008, 1012 and which my placed between the lower segment 1012 and a magnet brace 1024 and secured in place with one or more removable pins 1026 positioned through holes in the brace 1024, magnet 1026, and lower segment 1012. The pins 1026 and holes may be smooth (e.g., dowel or spring pin) or threaded (e.g., screw or bolt). The magnet may be secured to the bottom segment 1012 via removable pins 1026 such the inserting or removing the pins may be accomplished from the underside of the lower segment 1012 so as to not require removal of tools. The exemplary mechanism 1000 depicted in FIGS. 10A-10C is configured for use with tools of varying lengths in that the distance between the upper and lower segments 1008, 1012, and thus the distance between upper and lower slots in those segments, varies.

Figure 11:
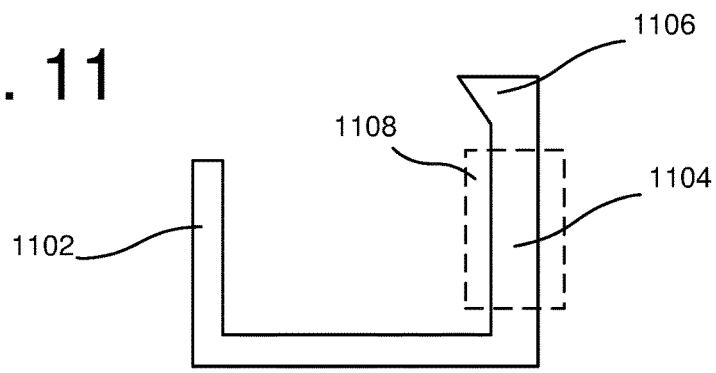
FIGS. 11-14 depict exemplary configurations of an elastic-band-retention hook according to an aspect of the invention.
Figure 12:
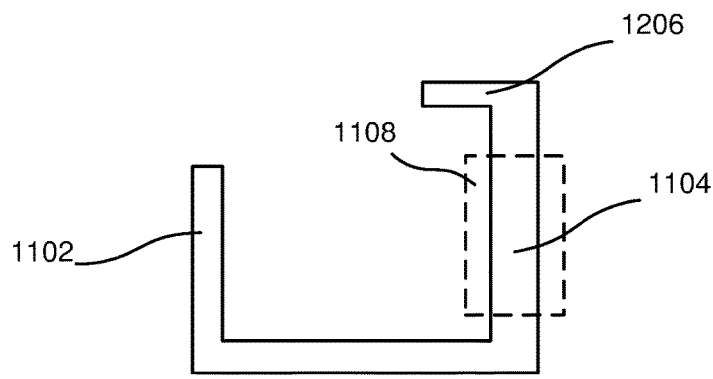
Figure 13:
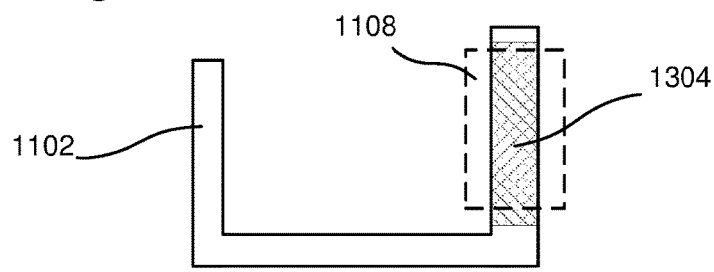
Figure 14:
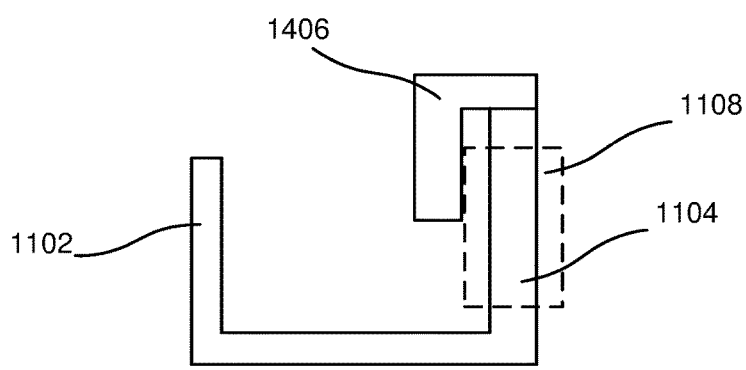

The band-retention hooks described above may be configured with any of a variety of mechanisms to help prevent the band from inadvertently disengaging from or slipping off the hook. For example, as depicted in FIG. 11, the portion 1104 of the hook configured to engage the band 1108 (distinct from the portion 1102 configured to mount to the tool holding mechanism) may have a flared end 1106 such as to resist removal of the band by requiring excess stretching of the band as compared to engagement portion 1104. In another example, as depicted in FIG. 12, the portion 1104 of the hook configured to engage the band may have a protruding end 1206 such as to resist removal of the band by requiring excess stretching of the band as compared to engagement portion 1104. In another example, as depicted in FIG. 13, the portion 1304 of the hook configured to engage the band may be imbued with a friction-enhancing surface (shown in cross hatch), such as a knurled, dimpled, or roughened surface. In another example, as depicted in FIG. 14, a clip 1406 may be used to secure the band 1108 to the portion 1104 of the hook configured to engage the band. The clip may be configured to removably attach to the clip or may be pivotably attached to the band-engagement portion 1104.

Figure 3:
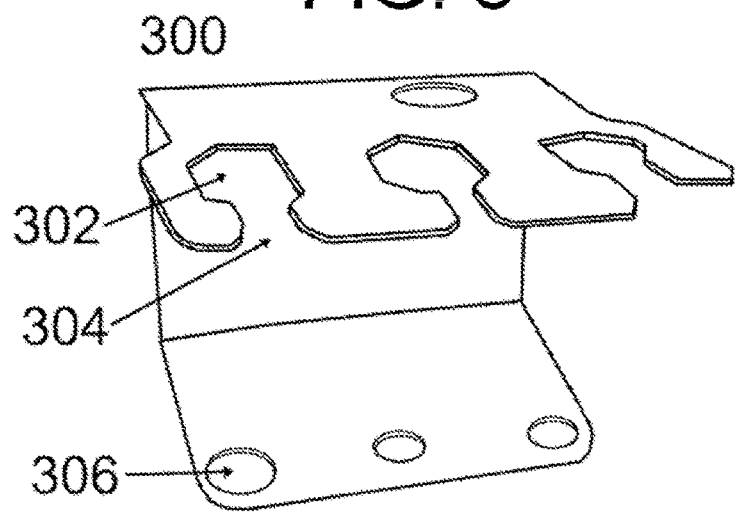
FIG. 3 is a front perspective view of a second tool holding mechanism according to an aspect of the invention.

FIG. 3 depicts a front perspective of a second tool holding mechanism 300. In one embodiment, the second tool holding mechanism 300 may comprise an upper cavity and a lower cavity 306. The upper cavity may comprise a first portion 302 and a second portion 304. The first portion 302 of the upper cavity may comprise a width greater than a width of the second portion 304 of the upper cavity. The first portion 302 may be internal to the second portion 304 so that the second portion 304 may form a channel to the first portion 302. The width of the first portion 302 of the upper cavity may be smaller than a first width of a tool. In one embodiment, the first width of the tool may be a width of a first portion of a handle of the tool. The width of the first portion 302 of the upper cavity and the width of the second portion 304 of the upper cavity may be greater than a second width of the tool. In one embodiment, the second width of the tool may be a width of a second portion of the handle of the tool. In one embodiment, a user may pass the second portion of the handle through the second portion 304 of the upper cavity and then set the first portion of the tool into the first portion 302 of the upper cavity. The lower cavity 306 may comprise a width greater than a width of an operational portion of the tool. In one embodiment, in response to the user setting the first portion of the handle of the tool into the first portion 302 of the upper cavity, the operational portion of the tool may set into the lower cavity 306. The second tool holding mechanism 300 may be coupled to a surface of the tool box 100. In one embodiment, the surface may be an internal surface of the tool box 100. In one embodiment, the surface may an internal surface of the door of the tool box 100. In one embodiment, the second tool holding mechanism 300 may be coupled to a surface of a mountable plate, such as the mountable plate 902 of FIG. 9.

Figure 4:
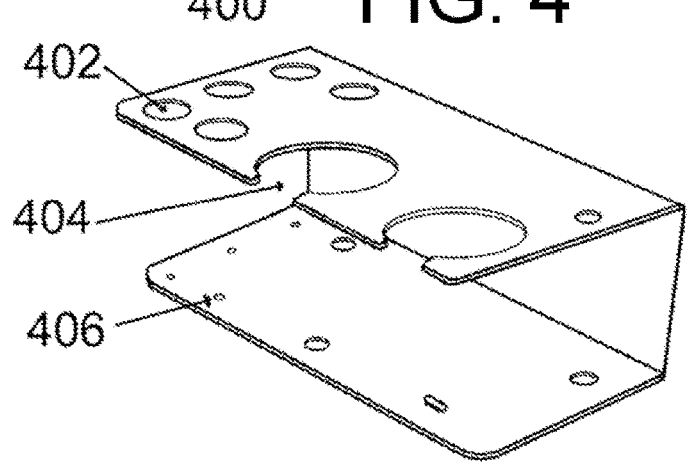
FIG. 4 is a front perspective view of a third tool holding mechanism according to an aspect of the invention.

FIG. 4 depicts a front perspective of a third tool holding mechanism 400. The third tool holding mechanism 400 may comprise a first type of upper cavity 402, a second type of upper cavity 404, and a lower cavity 406. The second type of upper cavity 404 may be the upper cavity of FIG. 3. The first type of upper cavity 402 may be internal to an upper portion of the third tool holding mechanism 400. The second type of upper cavity 404 may be exposed to a space external to the upper portion of the third tool holding mechanism 400 such that a tool may laterally pass into the second type of upper cavity 404. One of ordinary skill in the art will appreciate that a variety of types and quantities of cavities may be configured into the third tool holding mechanism. One of ordinary skill in the art will also appreciate that the configuration may be relative to a set of tools. The third tool holding mechanism 400 may be coupled to a surface of the tool box 100. In one embodiment, the surface may be an internal surface of the tool box 100. In one embodiment, the surface may an internal surface of the door of the tool box 100. In one embodiment, the third tool holding mechanism 400 may be coupled to a surface of a mountable plate, such as the mountable plate 902 of FIG. 9.

Figure 5:
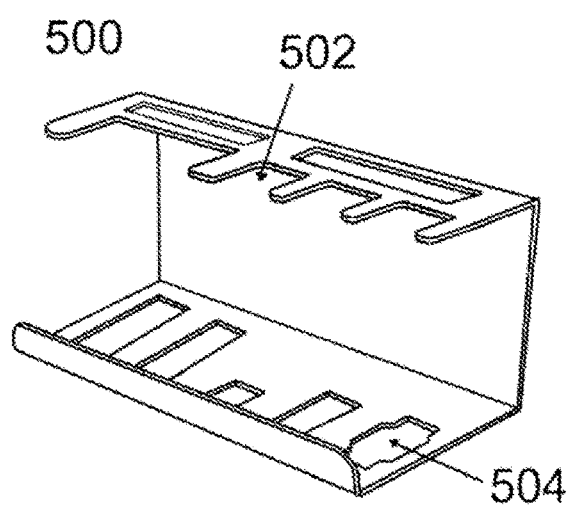
FIG. 5 is a front perspective view of a fourth tool holding mechanism according to an aspect of the invention.

FIG. 5 depicts a front perspective of a fourth tool holding mechanism 500. The fourth tool holding mechanism 500 may comprise an upper cavity 502 and a lower cavity 504. The upper cavity 502 may be exposed to a space external to an upper portion of the fourth tool holding mechanism 500 such that a tool may laterally pass into the upper cavity 502. The lower cavity 504 may be internal to a lower portion of the fourth tool holding mechanism 500. The fourth tool holding mechanism 500 may be coupled to a surface of the tool box 100. In one embodiment, the surface may be an internal surface of the tool box 100. In one embodiment, the surface may an internal surface of the door of the tool box 100. In one embodiment, the fourth tool holding mechanism 500 may be coupled to a surface of a mountable plate, such as the mountable plate 902 of FIG. 9.

Figure 15A:
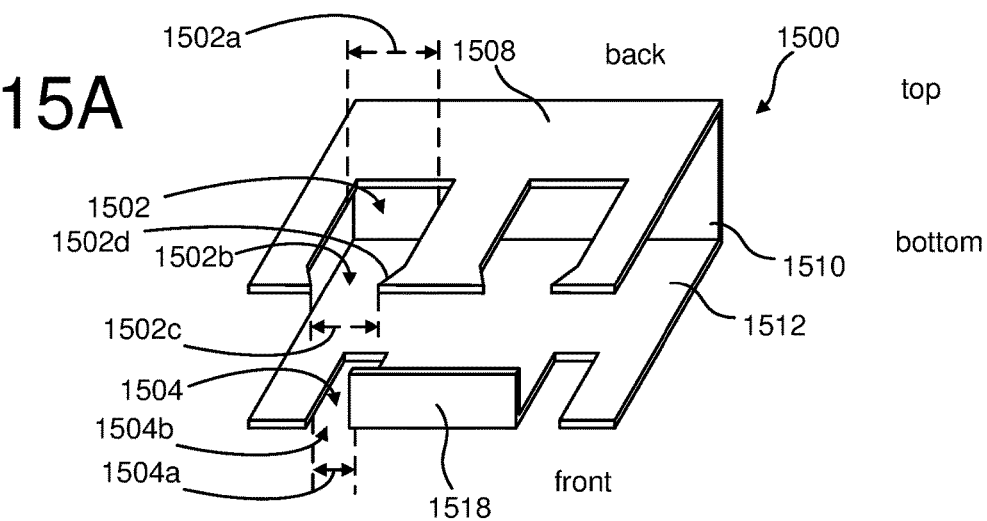
FIGS. 15A-15D are perspective views of an exemplary fifth tool holding mechanism according to an aspect of the invention.
Figure 15B:
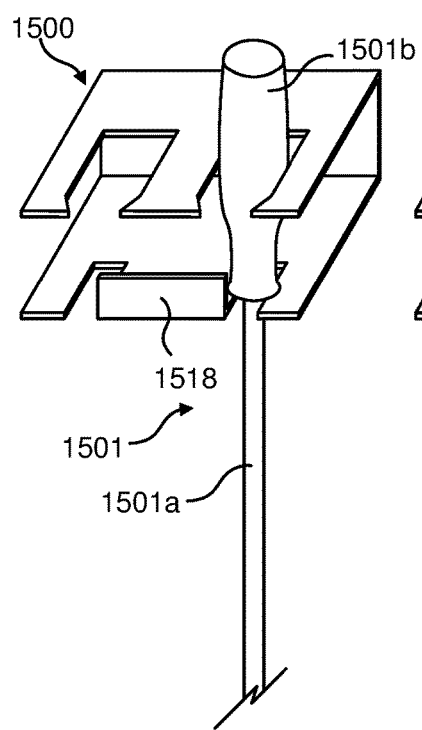
Figure 15C:
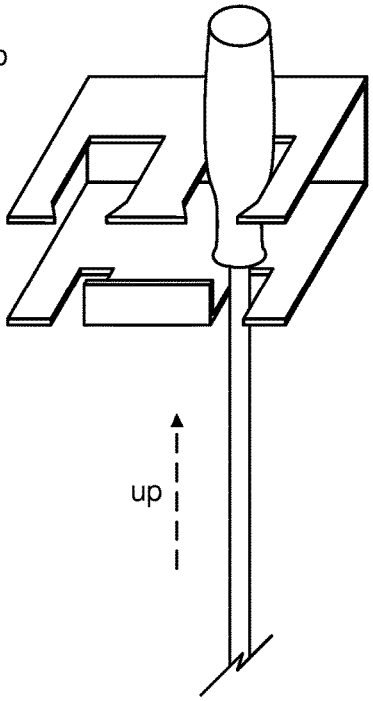
Figure 15D:
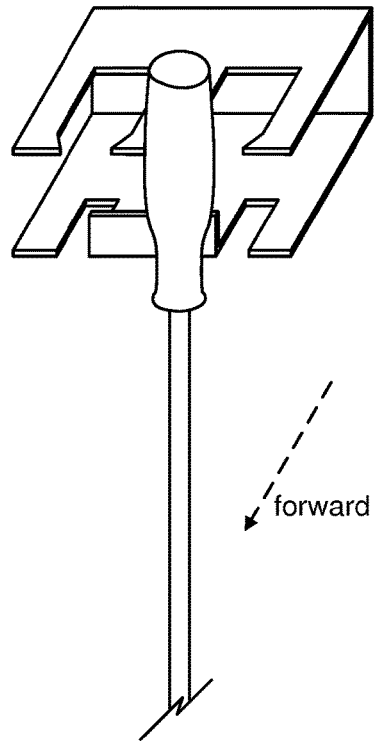

FIGS. 15A-15D are perspective views depicting a fifth tool holding mechanism 1500. In this exemplary embodiment, the fifth tool holding mechanism 1500 may comprise: (1) a back segment 1510 (2) a top segment 1508, and (3) a bottom segment 1512. The top 1508 and bottom 1512 segments connect to and project out from the back segment 1510. The top segment includes one or more top slots 1502 opening to the front of the top segment 1508. The bottom segment 1512 includes one or more bottom slots 1504 opening to the front of the bottom segment 1512. The top 1502 and bottom 1504 slots are aligned such that the slots 1502, 1504 may simultaneously receive an elongate handled tool 1501 (e.g., screw driver or pry bar) as shown in FIGS. 15B and 15C. The top slot 1502 has a width 1502a. The bottom slot 1504 has a width 1504a that is narrower than the top slot's width 1502a. Due to this difference in widths, the slots may be configured so that: (1) both the bottom and top slots are wide enough to receive a shank/shaft 1501a of the tool 1501, (2) the top slot 1502 is wide enough to receive the handle 1501b of the tool 1501, and (3) the bottom slot 1504 is too narrow to receive the handle 1501b. Thus, as depicted in FIG. 15B, the tool holding mechanism 1500 is configured to hold the tool 1501 with the shank/shaft 1501a projecting down through the bottom slot 1504 and the handle 1501b projecting up through the top slot 1502; the handle 1501b does not project through the bottom slot 1504 and is instead supported by the bottom segment 1512. A front retaining segment 1518 is positioned at the front of the bottom segment 1512 adjacent to the bottom slot 1504 near the front opening 1504b of the bottom slot 1504 and projects up from the bottom segment 1512 toward the top segment 1508. The front retaining segment 1518 defines a front aperture narrower than the tool handle 1501b and thereby restrains the tool 1501 from sliding out of the bottom slot 1504 to the front. As depicted in FIGS. 15B-15O, the tool 1501 would have to be moved up (FIG. 15C) from the bottom segment 1512 in an amount greater than the distance the front retaining segment 1518 projects up toward the top segment 1508 before it can slide forward (FIG. 15O) out of the bottom slot 1504. (The dashed arrows in FIGS. 15C and 15D denote the up and forward movement of the tool 1501 to extract the tool from the tool holding mechanism 1500.) The front opening 1502b of the top slot 1502 may be narrowed by a retaining protuberance (a "lip") 1502d such the width 1502c of the top slot's front opening 1502b is narrower than the widest portion of the tool handle 1501b. The retaining lip 1502d thereby restrains the tool 1501 from sliding out of the top slot 1502 to the front in much the same way the front retaining segment 1518 restrains the tool 1501 from sliding out of the bottom slot 1504 to the front. For tool handles 1501b with a taper (as depicted, e.g., in FIGS. 15B-15O), the top slot's front opening 1502b may have a width 1502c greater than the width of a narrowed portion of the tool handle 1501b. In such a configuration of the tool holder 1500, removing the tool 1501 from the holder 1500 requires moving the tool up so that the handle is above the front retaining segment 1518 and the narrowed portion of the handle is at the level of the of the top slot's front opening 1502b. For tool handles of a consistent width, removing the tool 1501 from the holder 1500 requires moving the tool up so that the handle is above the top segment 1508. In either circumstance, the upward movement of the tool 1501 required to remove the tool will be no greater than the length of the handle 1501b.

Figure 16A:
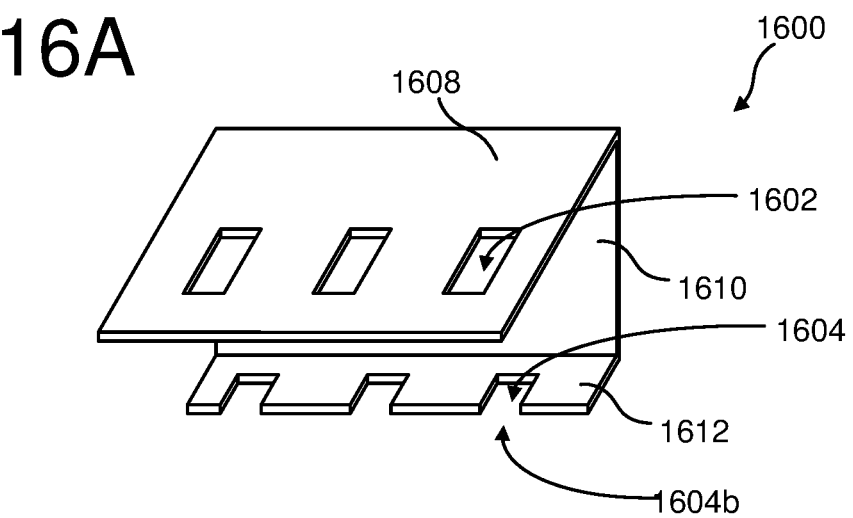
FIGS. 16A-16B are perspective and side views of an exemplary sixth tool holding mechanism according to an aspect of the invention.
Figure 16B:
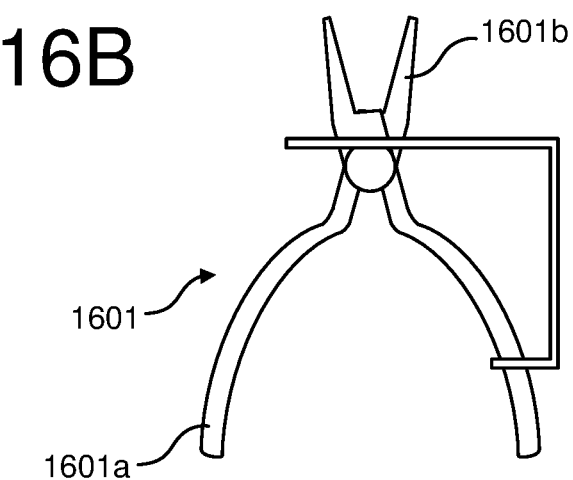

FIGS. 16A-16B are perspective and side views, respectively, depicting a sixth tool holding mechanism 1600. In this exemplary embodiment, the sixth tool holding mechanism 1600 may comprise: (1) a back segment 1610 (2) a top segment 1608, and (3) a bottom segment 1612. The top 1608 and bottom 1612 segments connect to and project out from the back segment 1610. The top segment 1608 includes a top hole 1602. The bottom segment 1612 includes one or more bottom slots 1604 opening 1604b to the front of the bottom segment 1612. The top holes 1602 and bottom slots 1604 are aligned such that the holes 1602 and slots 1604 may simultaneously receive biased-open pliers 1601. The top hole 1602 receives the jaws 1601b and the bottom slot 1604 receives a handle 1601a through the bottom slot's front opening 1604b. As the pliers 1601 are biased open, the open jaws 1601b are retained in the top hole 1602 and the handle 1601a is retained in the bottom slot 1604.

Figure 6A:
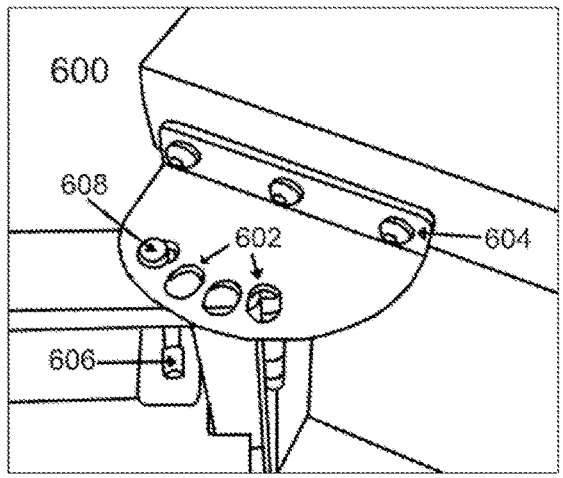
FIGS. 6A-6B are views of an exemplary door stop mechanism according to an aspect of the invention.
Figure 6B:
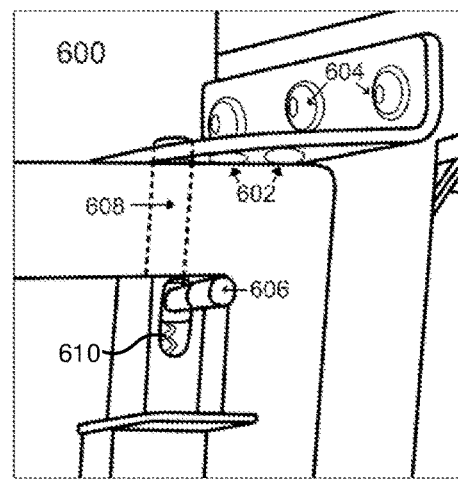

FIGS. 6A-6B depict an exemplary door stop mechanism 600. FIG. 6A is a top perspective view, FIG. 6B is a side perspective view. In one embodiment, the door stop mechanism 600 may comprise a plurality of holes 602 configured to secure a door of a tool box at a plurality of open angles. In one embodiment, at least one of the plurality of holes 602 may correspond with a closed position of the door. The door may comprise a stop 608 configured to protrude outward from a top side surface of the door and through at least one of the plurality of holes of the door stop mechanism. The door stop mechanism 600 may be configured to secure the door at the plurality of open angles by receiving the stop 608 in one of the plurality of holes 602. In one embodiment, the stop 608 may be configured to be controlled by a stop handle 606 disposed internal to the door. The stop 608 may be biased to engage the holes 602 using a spring 610. The biasing force of the spring 610 may be manually overridden using the stop handle 606 to remove the stop 608 from a hole 602 and thereby enable the door to move further open or closed.

Figure 7:
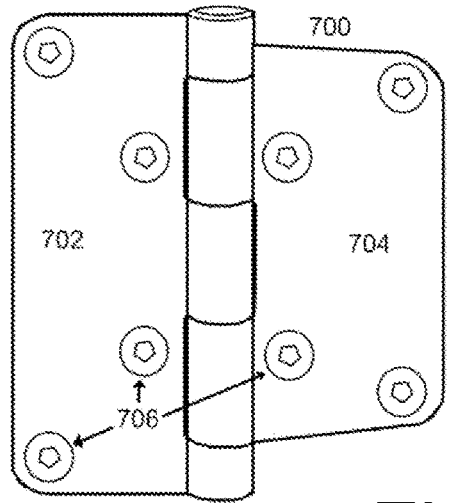
FIG. 7 is a front perspective view of a hinge.

FIG. 7 depicts a front view of a hinge 700. In one embodiment, the hinge 700 may be the hinge featured in a hinge locking system 800 of FIG. 1. The hinge 700 may comprise a first side 702 coupled to a tool box and a second side 704 coupled to a door of the tool box. The first side 702 and second side 704 may be coupled to the tool box and door, respectively, using a plurality of screws 706.

Figure 8A:
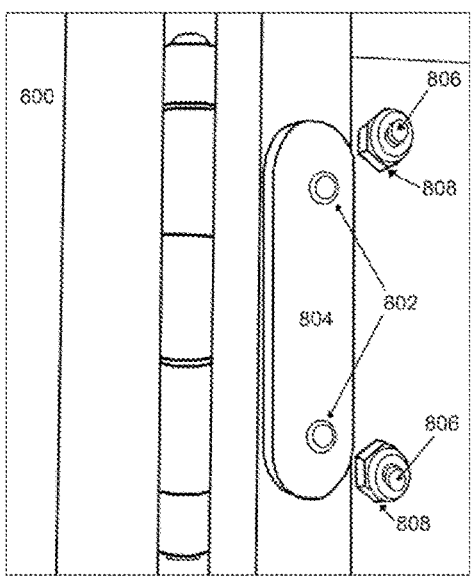
FIGS. 8A-8B are views of a hinge locking system according to an aspect of the invention.
Figure 8B:
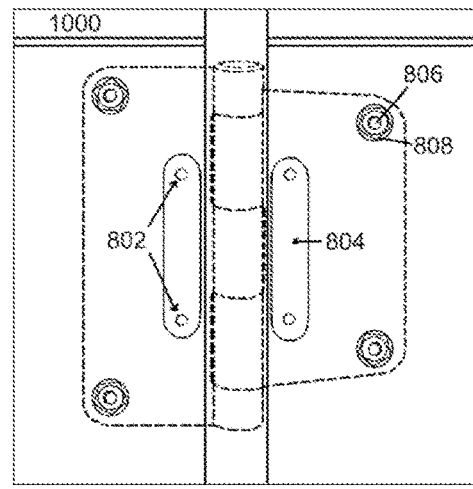

FIG. 8A-8B are back views depicting an exemplary hinge locking system 800 from a back view (with a hinge depicted in dashed line in FIG. 8B). The hinge locking system 800 may comprise at least one first screw 802 captured by a secured surface 804 and at least one second screw 806 captured by a lock nut 808. The secured surface 804 may be integral or attached to the door or tool box. The hinge locking system 800 enables a user installing a door to a tool box using screws or bolts in such a way that the user can adjust the door's hinges while the door is closed. The hinges can be preliminarily installed to the door/frame using first hinge screws (or similar threaded fasteners) 802 and secured surfaces 804 (e.g., an elongate plate with two threaded holes to accept the screws 802). The hinge is on the front side of the door/frame (the side facing away from the tool box when the door is closed), the secured surfaces 804 are on the back side of the door/frame (the side facing into the tool box when the door is closed). The first hinge screws 802 are disposed through mounting holes in the hinge and the door/frame and then into threaded holes in the secured surfaces 804. The secured surfaces 804, now preliminarily held in place by the first hinge screws 802, resist rotation when the first screws 802 are tightened thereby enabling the first screws 802 to be tightened with the door in the closed position. Thus, the door and frame may be finely aligned while the door is in the closed position and then the first hinge screws 802 may be tightened into the secured surfaces 804 to hold the door and frame in alignment. Once the door and frame are held in proper alignment, the door may be opened to install locking screws 806 (or similar threaded fasteners) that prevent removal of the hinge when the door is in the closed position. For example, second hinge screws 806 may be bolts disposed through mounting holes in the hinge and door/frame and secured in place using lock nuts 808 on the back side of door/frame. To remove the bolts 806, the door must first be opened to access the lock nuts 808. If the closed door is locked against opening, the hinges cannot be removed simply by removing all the screws 802, 806. The door lock can not be simply defeated by removing the hinges by removing the hinge screws 802, 806. Thus, a user can preliminarily install door to frame, close the door, adjust the door's fit iteratively until the door is properly fitted to the frame, tighten the first screws 802 to hold the door and frame in proper alignment, then use irremovable screws or locknuts to secure the door to the frame while the door is in an open position. This allows the door to be secure when it is closed as the hinges cannot be removed from the outside by removing the hinge screws 802, 806.

FIG. 9 is a perspective view of an exemplary portable tool holding system 900. The portable system 900 may comprise a mounting plate 902 and a plurality of tool holding mechanisms 904 coupled to a surface of the mounting plate 902. The mounting plate 902 may be configured with keyhole-style mounting holes 908 so as to be selectively slide-mountable to studs (e.g., screw-heads or bolt-heads) protruding from a surface (such as a wall in a house or shed or a surface of a tool box or work bench). The mounting plate 902 may be configured with an over-the-door hanging hook 910 so as to be selectively mountable to a door or similar slab. The portable tool holding system 900 may also be configured with a handle 906 for ease of transport. In one embodiment, the plurality of tool holding mechanisms 904 may comprise at least one of the first tool holding mechanism 200 of FIG. 2, the second tool holding mechanism 300 of FIG. 3, the third tool holding mechanism 400 of FIG. 4, the fourth tool holding mechanism 500 of FIG. 5, the fifth tool holding mechanism 1500 of FIGS. 15A-15B, or the sixth tool holding mechanism 1600 of FIGS. 16A-16B.

Returning to FIG. 1, the tool box 100 may comprise a back wall 103 and doors 104 and a plurality of tool holding mechanism variants 102 coupled to the wall 103 and doors 104. In one embodiment, the tool holding mechanism variants 102 may comprise at least one of the first tool holding mechanism 200 of FIG. 2, the second tool holding mechanism 300 of FIG. 3, the third tool holding mechanism 400 of FIG. 4, the fourth tool holding mechanism 500 of FIG. 5, the fifth tool holding mechanism 1500 of FIGS. 15A-15B, or the sixth tool holding mechanism 1600 of FIGS. 16A-16B. The tool box 100 my also include the door stop mechanism 600 and hinge locking systems 800 described herein.

While the foregoing description is directed to the preferred embodiments of the invention, other and further embodiments of the invention will be apparent to those skilled in the art and may be made without departing from the basic scope of the invention. And features described with reference to one embodiment may be combined with other embodiments, even if not explicitly stated above, without departing from the scope of the invention. The scope of the invention is defined by the claims which follow.

The invention claimed is:
1. A tool holding mechanism comprising:
 (a) a top segment comprising a top back side and a top front side and including at least one upper slot open at the top front side;
 (b) a bottom segment comprising a bottom back side and a bottom front side and including at least one lower slot open at the bottom front side;
 (c) a back segment comprising a back top side, a back bottom side, a back left side, and a back right side;
 (d) a magnet positioned between the top segment and the bottom segment; and
 (e) a first left-side band-retention hook and a first right-side band-retention hook;
 (f) wherein the top back side is connected to the back top side so that the top segment projects out from the back segment with a facing angle greater than 90 degrees; and
 (g) wherein the bottom back side is connected to the back bottom side so that the bottom segment projects out from the back segment with a facing angle of about 90 degrees.

2. The tool holding mechanism of claim 1 further comprising a first elastic band connected to the first left-side band-retention hook and the first right-side band-retention hook and thereby configured to apply a force toward the back segment on a tool positioned in the upper slot and lower slot.

3. The tool holding mechanism of claim 2 wherein the first elastic band is color-coded to indicate at least one of the group consisting of: length of the first elastic band, thickness of the first elastic band, and stiffness of the first elastic band.

4. The tool holding mechanism of claim 1 wherein the first left-side band-retention hook and the first right-side band-retention hook each includes at least one band-slip-prevention mechanism from the group consisting of a flared end, a protruding end, a roughened surface, and a clip.

5. The tool holding mechanism of claim 1 further comprising two elastic bands connected to the first left-side band-retention hook and the first right-side band-retention hook and thereby configured to apply a force toward the back segment on a tool positioned in the upper slot and lower slot.

6. The tool holding mechanism of claim 1 further comprising a second left-side band-retention hook and a second right-side band-retention hook.

7. The tool holding mechanism of claim 6 further comprising a first elastic band connected to the first left-side band-retention hook and the first right-side band-retention hook and a second elastic band connected to the second left-side band-retention hook and the second right-side band-retention hook and thereby configured to apply a force toward the back segment on a tool positioned in the upper slot and lower slot.

8. The tool holding mechanism of claim 1 wherein the back segment, the top segment, and the bottom segment are formed from a single sheet of material.

9. The tool holding mechanism of claim 1 wherein the magnet is positioned closer to the bottom segment than to the top segment.

10. The tool holding mechanism of claim 1 wherein the magnet is removably connected to the bottom segment with a pin.

* * * * *